Nov. 29, 1949
G. W. O'KEEFFE
Re. 23,177
CLOTH STEAMER
Original Filed Jan. 29, 1946
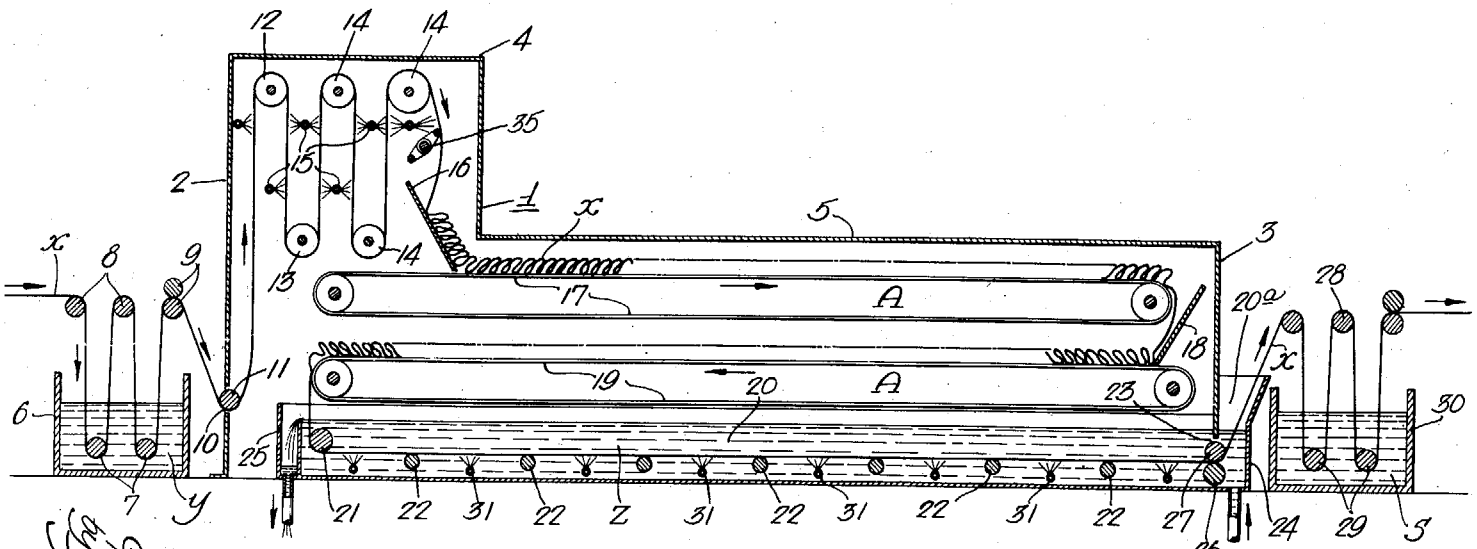
Inventor:
George W. O'Keeffe
by his Attorneys
Howson & Howson Reissued Nov. 29, 1949

Re. 23,177

UNITED STATES PATENT OFFICE 23,177

CLOTH STEAMER

George W. O'Keeffe, Elkins Park, Pa., assignor to Proctor & Schwartz, Inc., Philadelphia, Pa., a corporation of Pennsylvania Original No. 2,443,990, dated June 22, 1948, Serial No. 644,007, January 29, 1946. Application for reissue September 7, 1948, Serial No. 48,021

2 Claims. (Cl. 68—5)

This invention relates to what is known as an open width steamer for use in continuous cloth bleaching processes.

Prior to the present invention, the bleaching of cloth was carried on intermittently, with the cloth being packed in a kier during one step of the process, from which it was subsequently withdrawn to undergo another step of the process, prior to drying.

The intermittent treatment of the cloth was later supplanted by a continuous process, wherein the cloth was first run around spaced rolls submerged in a tank containing a caustic solution, from which the cloth emerged to pass through a mangle consisting of a pair of squeeze rolls between which the cloth was run to extract a maximum amount of free caustic solution therefrom.

From the caustic extracting mangle, the cloth was run around a series of rolls enclosed within what is known as a monitor, wherein the cloth was exposed to steam sprays in a concentrated steam atmosphere, whereby the cloth received a thorough steaming prior to being laid in folds on a continuous belt conveyor operating in a casing filled with a steam atmosphere.

The cloth then emerged from the steam chamber through a common J box. From here the cloth was run through a series of wash bowls entirely separated and removed from the steaming chamber, said wash bowls each including a series of rolls submerged in a washing solution contained in an open vat.

From the last of the wash bowls, the cloth was run through a second open tank, similar to the aforesaid caustic tank. In this second instance, the tank contained a peroxide solution. The process from this point followed a course of treatment similar to that followed in the aforesaid caustic process, i. e., the cloth passed through steaming, washing, and rinsing, after which it was finally dried.

The present invention relates to the continuous process and has to do more particularly with the steaming and washing equipment employed.

It is highly desirable that the water in the wash bowls be maintained at the highest temperature possible without boiling. In the aforesaid equipment, with the wash bowls separate and removed from the steaming chamber, it was necessary to maintain the washing solution at a temperature below the boiling point of the solution, to prevent loss of vapors from the open tops of the vats.

In accordance with the present invention, the wash bowls are arranged in the bottom of the steaming chamber, which permits the temperature of the washing solution to be raised above the boiling point thereof to effect a better washing of the cloth.

Maintaining the washing solution at a temperature above the boiling point thereof, as mentioned above, produces a steam vapor, which, in accordance with the present invention, rises into the steam atmosphere of the cloth steaming chamber. Thus, the steam vapor rising from the open top of the washing vat is advantageously employed in the steaming chamber and is not lost.

Another feature of the present invention is the installation of the washing bowl in the steaming chamber in such relation to the cloth delivery end thereof that an effective water seal is formed where the cloth emerges from the steaming chamber, to prevent the escape of steam therefrom, thereby affording another saving of steam.

The single figure of the accompanying drawing is a diagrammatic longitudinal vertical sectional view through the steaming chamber and wash bowl constructed in accordance with the present invention.

As shown in the drawing, the device comprises an enclosure or casing 1 embodying parallel side walls spaced apart and connected by end walls 2 and 3, and including a roof or top wall 5 having a step formation 4 at one end adjacent the end wall 2.

Outside the front wall 2 is an open tank 6. The tank 6 is provided with a series of rolls 7 adjacent the bottom thereof and a series of rolls 8 spaced above the open top of the tank.

A continuous strip of cloth X is run over the top rolls 8 and under the bottom rolls 7 alternately, through a caustic or other bleaching or treating solution or fluid $y$ maintained at a predetermined level above the rolls 7 within the tank 6. The cloth X emerges from the fluid $y$ at one end of the tank 6 and passes between a pair of squeeze rolls 9, 9 by which excessive free fluid is extracted from the cloth X.

From the squeeze rolls 9, 9, the cloth passes through an inlet slot 10 in the end wall 2 of the casing 1 and passes under an input roller 11 rotatably mounted in the casing 1 adjacent the end wall 2.

From the input roller 11, the cloth passes upwardly and over a roller 12, thence downwardly to and under a lower roller 13, from which the cloth runs up and down around a plurality of rollers 14, etc., in the step portion 4 of the casing 1.

While passing around the rollers 12, 13, 14, etc., the cloth is subjected to steaming from a series of steam sprays 15, 15.

Upon leaving the last roller of the 12, 13, 14 series, the cloth falls onto an inclined chute 16, located in the upper part of the casing 1. The cloth drops to one side of a rotary folding reel 35 located above the upper end of the chute 16 and by which the cloth is laid back and forth in successive folds on the chute 16.

From the chute 16, the folded cloth slides onto one end of the upper run of a horizontally disposed endless belt conveyor 17 which transports the folded cloth lengthwise of the casing 1 in an atmosphere of steam maintained in the steaming chamber A afforded by the casing 1.

From the end of the conveyor 17 adjacent the end wall 3 of the casing 1, the cloth X falls onto an inclined chute 18 which directs it onto the top run of a second endless belt conveyor 19. The conveyor 19 underlies the conveyor 17 and conducts the folded cloth X toward the end wall 2 of the casing 1.

From the end of the conveyor 19, the cloth falls and unfolds in a straight planar condition into a body of washing solution *z* maintained in a pan, trough, or vat 20 located in the bottom of the steaming chamber A.

The cloth passes under an input roller 21 rotatably mounted in one end of the washing trough 20 and runs the full length of the trough 20, submerged in the washing solution *z*, supported against excessive sagging by a series of horizontal laterally spaced rollers 22, 22 submerged therein.

It will be noted that the lower portion of the end wall 3 is cut away, as indicated at 23, to an elevation above the plane of the cloth passing horizontally through the solution *z* in the washing trough 20 to permit the cloth to pass thereunder.

The trough or pan 20 has an end wall 24 parallel to and spaced outwardly from the end wall 3 of the casing 1 and rising to an elevation above the level of the lower edge 23 of the end wall 3. The opposite inside end wall 25 of the trough 20 rises to an elevation substantially coincident with that of the outside end wall 24 of the trough, whereby the level of the solution *z* in the trough 20 is maintained above the elevation of the lower edge 23 of the end wall 3, whereby a water seal is formed at the delivery end of the casing 1 where the cloth X emerges therefrom and whereby loss of steam from the casing 1 is reduced to an insignificant minimum.

In emerging from the casing 1 through the aforesaid water seal, the cloth fabric passes between a pair of output rollers 27 and 26, which are located in the narrow transversely extending end portion 20*a* of the washing pan 20 which lies outside and beyond the end wall 3 of the casing 1.

As the cloth or fabric X emerges from the narrow transversely extending trough-like end portion of the pan 20, which lies outside the casing 1, it passes upwardly over the top of one roller and then downwardly under the bottom of another roller alternately of vertically spaced series of rollers 28 and 29, the lower series of which is submerged in a solution *s* in an open tank 30 located outside the end wall 3 of the casing 1.

The tank 30 may contain either a peroxide solution or a rinsing solution or any other suitable fluid depending on the stage of the bleaching system as a whole in which this particular tank 30 is being employed.

It will be understood that the major portion of the steam atmosphere within the casing 1 may be obtained and maintained therein from any suitable source extraneous to the casing 1 with the steam generated in the pan 20 being merely supplementary or the steam atmosphere in the casing 1 may be generated and sustained solely by the boiling of the fluid in the pan 20, alone or together with the steam contributed by the sprays 15, 15.

In the present instance, the liquid *z* in the pan 20 is shown as being heated by a series of steam pipes 31, 31 located in the bottom of the pan 20 and which may receive steam from any suitable source such as a service boiler, from which the steam for the sprays 15, 15 may also be derived.

The various rollers around which the cloth X passes and the rollers around which the endless belts 17 and 19 pass may be driven at various relative speeds from any suitable source of power through conventional power transmitting and speed changing mechanisms (not shown) to advance the fabric through the apparatus in single flat state and in the folds as shown in the drawings.

I claim:

1. An apparatus for treating fabrics comprising a casing including spaced end walls and affording a fabric steaming chamber, means for maintaining a steam atmosphere in said chamber, means for supporting fabric in said chamber, a water pan in the lower portion of said chamber and comprising one end wall outside and spaced from an adjacent end wall of said casing, means for maintaining water at a predetermined level in said pan, said adjacent end wall of said casing having a lower terminal edge disposed at a level below the level of the water in said pan to form a trap to prevent escape of steam from said casing, means adapted to heat water in said pan to the boiling temperature to cause steam to rise from the water in the pan and mingle with the steam in said chamber, and conveyor means arranged above said pan for advancing the fabric through the steam atmosphere in said chamber in at least one horizontal course and then discharge the same into the water in said pan, means to advance the fabric the full length of the pan through the water therein to emerge from said casing through said trap, and means below the water level in said pan to support the fabric against sagging during travel thereof through the liquid in said pan.

2. An apparatus for treating fabrics, comprising a casing affording a chamber adapted to contain a fabric-treating vapor, a pan in the lower portion of said chamber to contain a fabric-treating liquid, means to heat said liquid to a temperature to cause vapor to rise therefrom in said chamber, a pair of horizontally extending endless conveyors arranged in vertically spaced relation in said chamber above said pan and operable to convey the fabric through the vapor in said chamber in reversely directed horizontal courses and then discharge the same into the liquid in said pan, means to advance the fabric the full length of the pan through the liquid therein, and a series of rollers arranged at spaced intervals longitudinally of the pan below the liquid level therein to support the fabric against excessive sagging during travel thereof through the liquid in said pan.

GEORGE W. O'KEEFFE.

REFERENCES CITED

The following references are of record in the file of this patent:

UNITED STATES PATENTS

| Number | Name | Date |
|---|---|---|
| 2,133,823 | McClellan | Oct. 18, 1938 |
| 2,289,930 | Payen | July 14, 1942 |
| 2,412,188 | Wolfenden | Dec. 3, 1946 |

FOREIGN PATENTS

| Number | Country | Date |
|---|---|---|
| 250 | Great Britain | 1876 |